(12) United States Patent
Yan et al.

(10) Patent No.: US 12,550,101 B2
(45) Date of Patent: Feb. 10, 2026

(54) POSITIONING METHOD, DEVICE, AND SYSTEM, AND STORAGE MEDIUM

(71) Applicants: CHINA MOBILE SHANGHAI ICT CO., LTD, Shanghai (CN); CHINA MOBILE COMMUNICATIONS GROUP CO., LTD., Beijing (CN)

(72) Inventors: Mingyang Yan, Shanghai (CN); Shuo Sheng, Shanghai (CN)

(73) Assignees: CHINA MOBILE SHANGHAI ICT CO., LTD, Shanghai (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 757 days.

(21) Appl. No.: 17/995,306

(22) PCT Filed: Apr. 1, 2021

(86) PCT No.: PCT/CN2021/085010
§ 371 (c)(1),
(2) Date: Oct. 26, 2022

(87) PCT Pub. No.: WO2021/197446
PCT Pub. Date: Oct. 7, 2021

(65) Prior Publication Data
US 2023/0164733 A1   May 25, 2023

(30) Foreign Application Priority Data
Apr. 3, 2020  (CN) .......................... 202010260719.4

(51) Int. Cl.
*H04L 1/00* (2006.01)
*H04W 64/00* (2009.01)

(52) U.S. Cl.
CPC .................................. *H04W 64/00* (2013.01)

(58) Field of Classification Search
CPC ....... H04W 64/00; H04W 4/02; H04W 12/06; H04W 12/63; G01S 5/009; G01S 19/03;
(Continued)

(56) References Cited

U.S. PATENT DOCUMENTS 10,506,543 B1    12/2019  Edge
2008/0065836 A1*  3/2008  Chen ..................... G06F 3/0637
                                                            711/147
(Continued)

FOREIGN PATENT DOCUMENTS

CN          104168028 A   * 11/2014
CN          104977596 A     10/2015
(Continued)

OTHER PUBLICATIONS

International Search Report in the international application No. PCT/CN2021/085010, mailed on Jul. 7, 2021.
(Continued)

*Primary Examiner* — Tanmay K Shah
(74) *Attorney, Agent, or Firm* — Syncoda LLC; Feng Ma

(57) ABSTRACT

The application discloses a positioning method, device, and system, and a storage medium. The method includes: receiving first location information sent from a terminal, the first location information comprising an identity of the terminal; sending a differential data request to a second server, the differential data request comprising the first location information, and the differential data request being used by the second server to determine differential data of the terminal, receiving the differential data sent from the second server; performing calculation on the first location information according to the differential data to obtain second location information; sending the second location information to the terminal, so that a positioning result can be quickly returned
(Continued)

to the terminal, and the network delay is greatly reduced when the terminal determines a precise location.

15 Claims, 13 Drawing Sheets

(58) Field of Classification Search
CPC ..... G01S 19/073; H04L 63/083; H04L 67/14; H04L 67/52; H04L 61/4511; H04L 63/0876; H04L 67/1095; H04L 67/141; H04L 67/143
USPC ...................................................... 455/456.1
See application file for complete search history.

(56) References Cited

U.S. PATENT DOCUMENTS

| | | |
|---|---|---|
| 2008/0309550 A1 | 12/2008 | Sairo |
| 2013/0099965 A1 | 4/2013 | Sairo |
| 2017/0171701 A1 | 6/2017 | Zhou |
| 2018/0246219 A1 | 8/2018 | Zhang et al. |
| 2019/0182665 A1 | 6/2019 | Edge |
| 2020/0045666 A1 | 2/2020 | Edge |
| 2021/0282006 A1 | 9/2021 | Edge |

FOREIGN PATENT DOCUMENTS

| | | | | |
|---|---|---|---|---|
| CN | 106982463 A | | 7/2017 | |
| CN | 109541655 A | | 3/2019 | |
| CN | 109597109 A | * | 4/2019 | ............. G01S 19/45 |
| CN | 109814137 A | | 5/2019 | |
| CN | 109862519 A | | 6/2019 | |
| CN | 110895343 A | | 3/2020 | |
| CN | 111090111 A | | 5/2020 | |
| WO | 2006043123 A1 | | 4/2006 | |
| WO | 2017070910 A1 | | 5/2017 | |

OTHER PUBLICATIONS

Written Opinion of the International Search Authority in the international application No. PCT/CN2021/085010, mailed on Jul. 7, 2021.
Supplementary European Search Report in the European application No. 21782057.0, mailed on Aug. 3, 2023. 7 pages.

* cited by examiner

POSITIONING METHOD, DEVICE, AND SYSTEM, AND STORAGE MEDIUM

CROSS-REFERENCE TO RELATED APPLICATION

The present application is based on and claims priority to Chinese patent application No. 202010260719.4, filed on Apr. 3, 2020, the disclosure of which is hereby incorporated by reference in its entirety.

TECHNICAL FIELD

The application relates to the technical field of communications, and particularly relates to a positioning method, apparatus and system, and a storage medium.

BACKGROUND

During automatic driving, high-precision positioning of a vehicle is the first important factor to ensure the driving safety of the vehicle.

At present, the high-precision positioning technology mainly adopts a "cloud+end" positioning mode. The "cloud+end" positioning mode includes a cloud server and a satellite positioning terminal. Through the cloud server, differential data obtained by a ground reference station and global satellite ephemeris are combined to determine a differential positioning result of the satellite positioning terminal, which is fed back to the satellite positioning terminal.

However, the communication between the cloud server and the satellite positioning terminal in the "cloud+end" positioning mode may lead to a large network delay.

SUMMARY

Embodiments of the application provide a positioning method, apparatus and system and a storage medium, which can greatly reduce a network delay and quickly return a terminal positioning result.

According to a first aspect, a positioning method is provided, which is applied to a first server. The method may include the following operations.

First location information sent by a terminal is received. The first location information includes an identity of the terminal.

A differential data request is sent to a second server. The differential data request includes the first location information, and the differential data request is used for the second server to determine the differential data of the terminal.

The differential data sent by the second server is received.

According to the differential data, the first location information is calculated to obtain second location information.

The second location information is sent to the terminal.

According to a second aspect, a positioning method is provided, which is applied to a terminal. The method may include the following operations.

First location information is sent to a first server. The first location information includes an identity of the terminal.

The second location information sent by the first server is received.

According to a third aspect, a positioning method is provided, which is applied to a second server. The method may include the following operations.

A differential data request sent by a first server is received. The differential data request includes first location information, and the first location information includes an identity of a terminal.

Differential data of the terminal is determined according to the differential data request.

The differential data is sent to the first server.

According to a fourth aspect, a positioning apparatus is provided, which is applied to a first server. The apparatus may include: a receiving module, a sending module and a calculation module.

The receiving module is configured to receive first location information sent by a terminal. The first location information includes an identity of the terminal.

The sending module is configured to send a differential data request to a second server. The differential data request includes the first location information, and the differential data request is used for the second server to determine the differential data of the terminal.

The receiving module is further configured to receive the differential data sent by the second server.

The calculation module is configured to calculate, according to the differential data, the first location information to obtain second location information.

The sending module is further configured to send the second location information to the terminal.

According to a fifth aspect, a positioning apparatus is provided, which is applied to a terminal. The apparatus may include: a sending module and a receiving module.

The sending module is configured to send first location information to a first server. The first location information includes an identity of the terminal.

The receiving module is configured to receive second location information sent by the first server.

According to a sixth aspect, a positioning apparatus is provided, which is applied to a second server. The apparatus may include: a receiving module, a determination module, and a sending module.

The receiving module is configured to receive a differential data request sent by a first server. The differential data request includes first location information, and the first location information includes an identity of a terminal.

The determination module is configured to determine differential data of the terminal according to the differential data request.

The sending module is configured to send the differential data to the first server.

According to a seventh aspect, a positioning system is provided. The system includes: a terminal, at least one first server and a second server.

The terminal is configured to send first location information to a first server. The first location information includes an identity of the terminal.

The first server is configured to receive the first location information and send a differential data request to the second server. The differential data request includes the first location information, and the differential data request is used for the second server to determine the differential data of the terminal.

The second server is configured to receive the differential data request and determine the differential data of the terminal according to the differential data request. The differential data request includes first location information. The first location information includes the identity of the terminal.

The first server is further configured to receive the differential data sent by the second server, and calculate the first location information according to the differential data to determine the second location information of the terminal.

The terminal is further configured to receive the second location information sent by the first server.

According to an eighth aspect, a computer storage medium is provided. On the computer storage medium, computer program instructions are stored. The computer program instructions, when executed by a processor, implement the method as in the first aspect or any possible implementation mode of the first aspect, or implement the method as in the second aspect or any possible implementation mode of the second aspect, or implement the method as in the third aspect or any possible implementation mode of the third aspect.

Based on the provided positioning method, apparatus and device and storage medium, first location information sent by a terminal is received through a first server. The first location information includes the identity of the terminal. A differential data request is sent to a second server. The differential data request includes the first location information, and the differential data request is used for the second server to determine the differential data of the terminal. Differential data sent by a second server is received. According to the differential data, the first location information is calculated to obtain the second location information. The second location information is sent to the terminal, and then a terminal positioning result is quickly returned, so that a network delay is greatly reduced when the terminal determines the precise location.

BRIEF DESCRIPTION OF THE DRAWINGS

In order to more clearly explain the technical solutions in the embodiments of the application, the drawings required in the embodiments of the application will be briefly introduced below. Those of ordinary skill in the art may also obtain other drawings in accordance with these drawings without paying creative labor.

DETAILED DESCRIPTION

Figure 1:
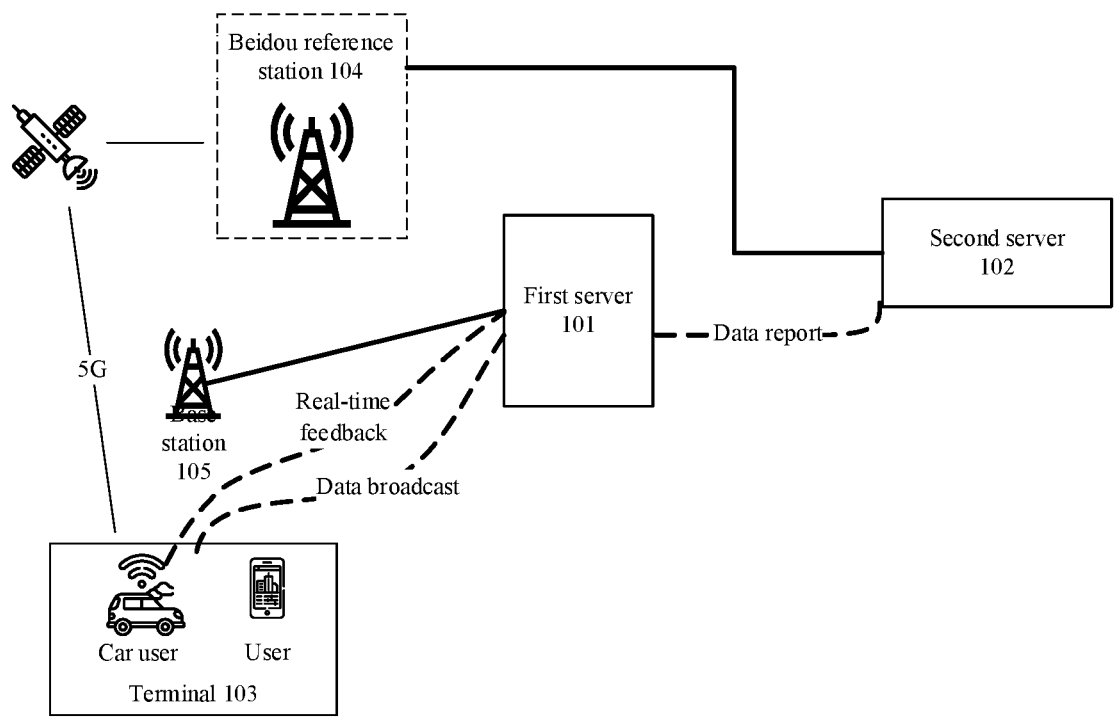
FIG. 1 is a structural schematic diagram of a positioning system according to an embodiment of the application.

Features and exemplary embodiments of various aspects of the application will be described in detail below. To make the objectives, technical solutions, and advantages of the application clearer, the application is described below in detail with reference to the accompanying drawings and specific embodiments. It is to be understood that the specific embodiments described herein are only configured to explain the application and not configured to limit the application. For those skilled in the art, the application may be implemented without some of these specific details. The following description of the embodiments is only to provide a better understanding of the application by showing examples of the application.

It is to be noted that relational terms such as first and second herein are only used to distinguish one entity or operation from another entity or operation, and do not necessarily require or imply any such actual relationship or sequence between these entities or operations. Moreover, terms "include" and "contain" or any other variant are intended to cover nonexclusive inclusions herein, so that a process, method, goods or device including a series of elements not only includes those elements but also includes other elements which are not clearly listed or further includes elements intrinsic to a process, a method, article or device. Under the condition of no more limitations, an element defined by the statement "including a/an" does not exclude existence of the same other elements in a process, method, article or device including the element.

At present, the high-precision positioning technology mainly adopts a "cloud+end" positioning mode. The "cloud+end" positioning mode includes a cloud server and a satellite positioning terminal. Through the cloud server, differential data obtained by a ground reference station and global satellite ephemeris are combined to determine a differential positioning result of the satellite positioning terminal, which is fed back to the satellite positioning terminal.

However, the communication between the cloud server and the satellite positioning terminal in the "cloud+end" positioning mode may lead to a large network delay and cannot support applications in the automatic driving field.

With the in-depth application of cloud computing, and the rapid development of 5th generation mobile networks (5G), Internet of Things and artificial intelligence technology, new applications with high bandwidth, low time delay and massive connections are constantly emerging. The traditional "cloud+end" business service, management and deployment mode is gradually moving towards a "cloud+edge+end" business service, management and deployment mode, and the correlation between the cloud and the network on the edge of the network is getting closer and closer.

Multi-access Mobile Edge Computing (MEC) is a key technology to integrate services and networks in the 5G era. MEC extends the computing, resources such as storage, and capability platforms of a cloud computing center to the edge of the network side of an operator, and provides network capability opening, Internet Technology (IT) services, environment and cloud computing capabilities at the position close to a mobile user. The feature of nearby service of MEC meets the requirements of real-time data processing in business level and data security and reliability in customer level. MEC provides cloud computing capability for application developers and content, and IT service environment at the edge of the network. The environment is characterized by ultra-low delay and high bandwidth, and an application may make use of the real-time access of wireless network information.

In the Internet of Things era, a plurality of Internet of Things devices need to provide a positioning service, and the positioning need is more obvious especially for a moving object. The higher the precision of the positioning technology, the better. For example, in the automatic driving field, due to the high-speed movement of a vehicle, high-precision positioning with ultra-low time delay is required as a navigation basis. However, high-precision positioning with ultra-low time delay may occupy a large amount of real-time bandwidth. Then, combined with an edge computing module, rapid data reporting, and real-time processing and synchronization of information may be achieved.

However, at present, the method of deploying a differential positioning system using an MEC node mainly relies on multiple Continuously Operating Reference Stations (CORS) systems and multiple MEC nodes, and each CORS system is relatively independent, so data roaming and differential data synchronization of a terminal device cannot be performed, and the goal of quick response when switching areas cannot be achieved for services with strict low delay requirements.

Therefore, the embodiments of the application provide a positioning method, apparatus and system and a storage medium, which can greatly reduce a network delay and quickly return a terminal positioning result.

In order to facilitate the understanding of the embodiments of the application, the positioning system provided by the embodiments of the application is first described in detail.

FIG. 1 is a structural schematic diagram of a positioning system according to an embodiment of the application.

As shown in FIG. 1, the positioning system provided in the embodiment of the application includes a first server 101, a second server 102 and a terminal 103.

Figure 2:
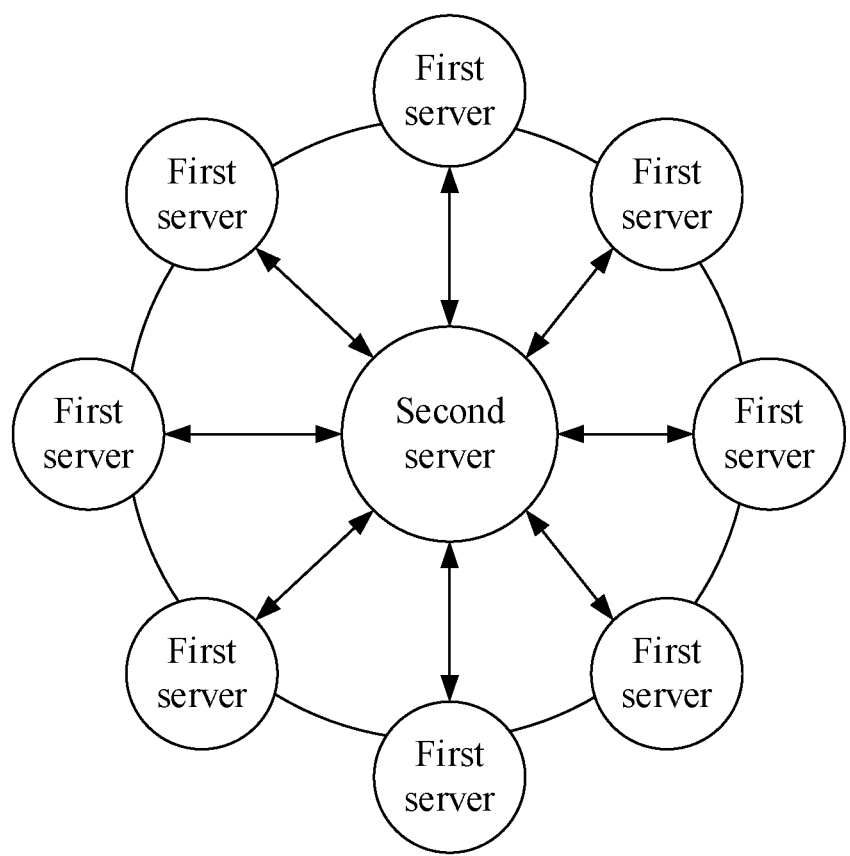
FIG. 2 is a structural schematic diagram of connection of a first server and a second server according to an embodiment of the disclosure.

It is to be noted that, as shown in FIG. 2, the second server 102 is connected to a plurality of first servers 101 to form a star-based network structure, all information flow synchronization and data interaction are performed through the second server 102, and the second server 102 keeps a high availability state. Meanwhile, all data are synchronized based on the data of the second server 102, which ensures the timeliness and uniformity of data, and coordinates all the first servers 101 to jointly provide a terminal differential calculation service. Here, the first server may be an edge server, and the second server may be a central server.

Figure 3:
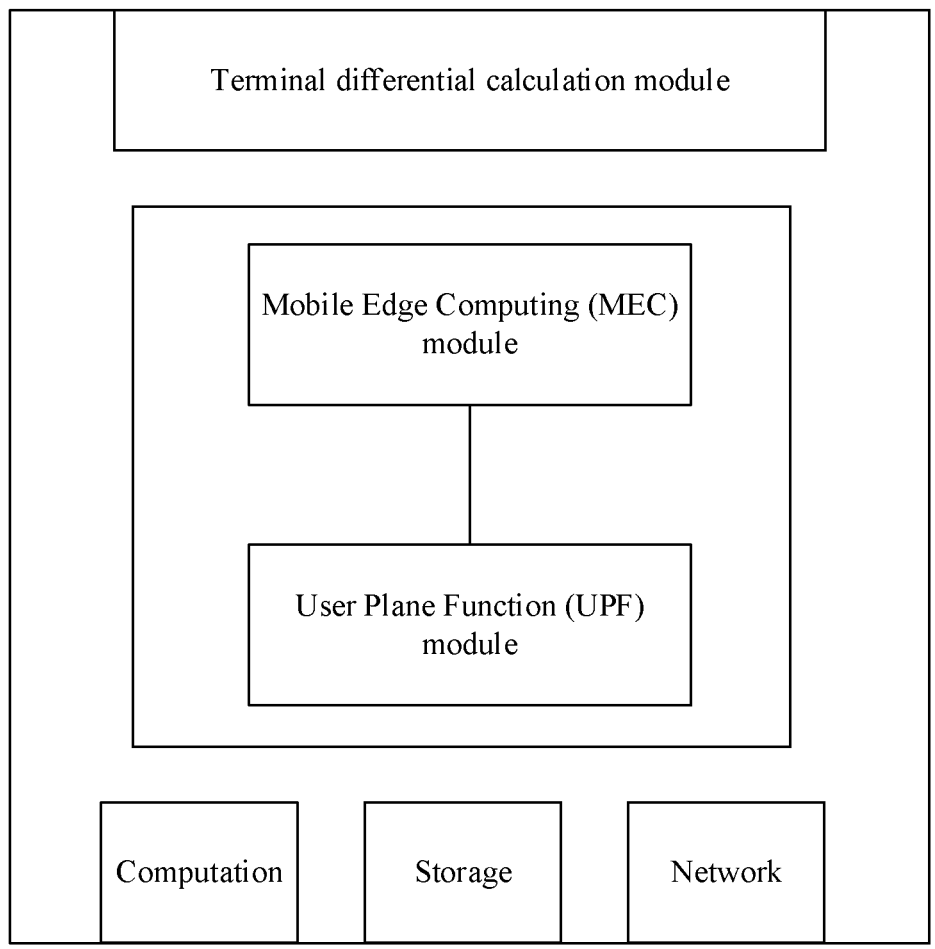
FIG. 3 is a structural schematic diagram of a first server according to an embodiment of the application.

Herein, the first server 101 is mainly configured to perform differential calculation on first location information of the terminal using the differential data sent by the second server 102. The first server 101 may include a terminal differential calculation module, a MEC module and a UPF function shunting module, as shown in FIG. 3.

Figure 4:
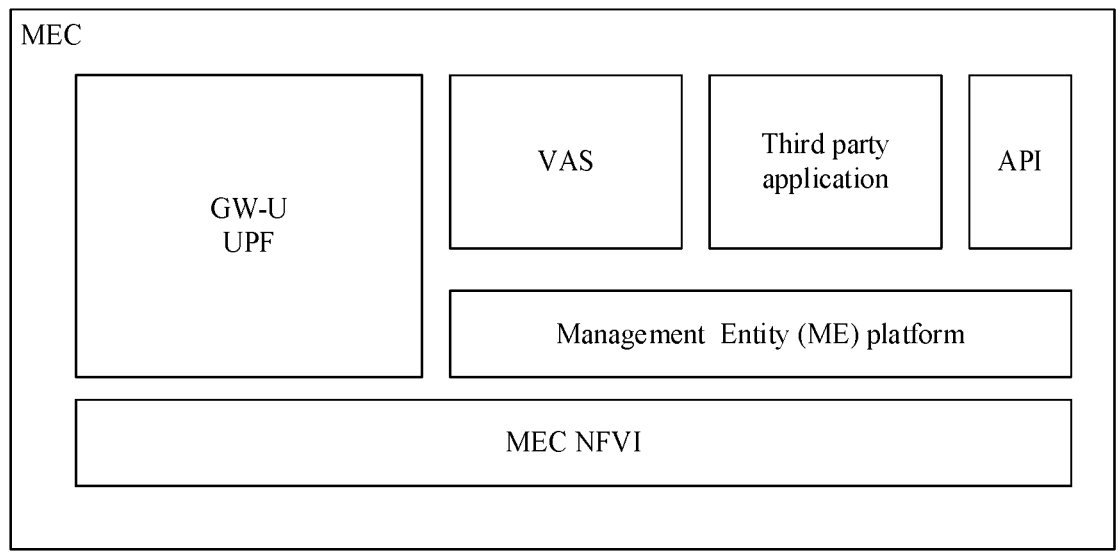
FIG. 4 is a structural schematic diagram of an Mobile Edge Computing (MEC) module according to an embodiment of the application.

Herein, the MEC module is configured to perform differential calculation on the differential data and manage a shunting service of the UPF shunting module. The MEC module may include: Gateway-UPF (GW-U) UPF, Value-Added Services (VAS), 3rd Application, Application Programming Interface (API) and MEC Network Functions Virtualization Infrastructure (NFVI), as shown in FIG. 4. GW-U UPF consists of a control panel network element of which the 5G core network sinks to edge computing. VAS is integrated on a MEP platform and consists of a value-added service provided by an operator to an APP. 3rd Apps are edge applications, and are integrated on a Management Entity (ME) platform. API is responsible for opening of network capabilities and opening of platform capabilities. MEC NFVI is responsible for providing MEC hardware infrastructure and Infrastructure as a Service (IaaS) device.

Figure 5:
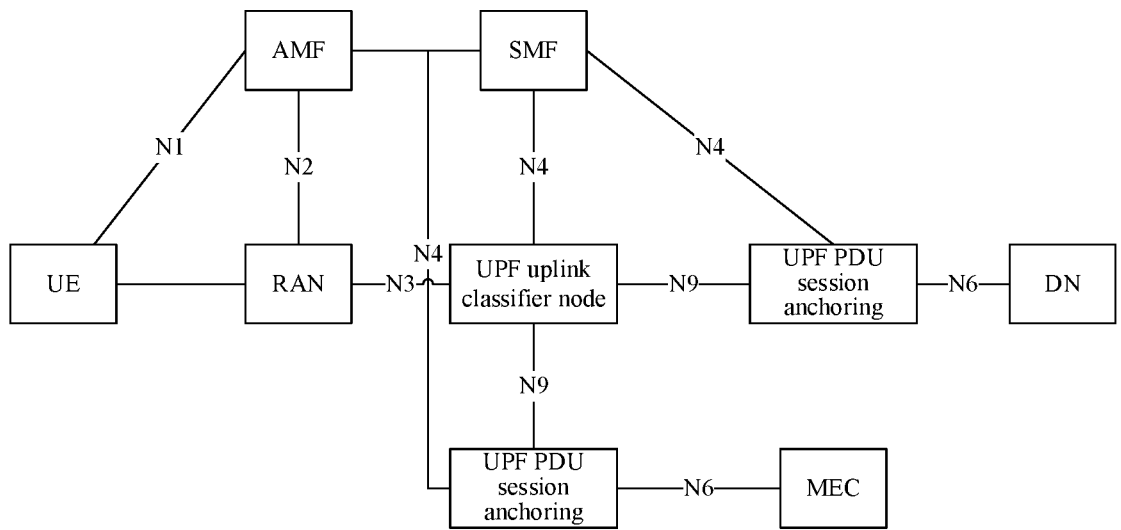
FIG. 5 is a structural schematic diagram of a User Plane Function (UPF) shunting module according to an embodiment of the application.

The UPF shunting module is configured to shunt a corresponding identity, terminal type information and the like when the terminal requests the second location information. The UPF shunting module includes an Authentication Management Function (AMF) as access and mobility management, a Session Management Function (SMF) as session management, a Wireless Access Network (RAN) as a wireless side, and a Domain Name (DN) as a domain name resolution service. Meanwhile, UPF is divided into an uplink class filter and a Protocol Data Unit (PDU) session anchor, as shown in FIG. 5. AMF is responsible for the access authentication between the terminal and the MEC node, and the authentication is based on a user name, a password and a security key uploaded by the terminal. The AMF node may upload device information to the second server after the authentication is passed, which is used as the basis for re-access when switching the first server across areas. The SMF is responsible for session management, automatic allocation and management of client addresses, as well as responsible for selection and control of upload of some part of data streams. The RAN is the wireless side, which consists of a series of transmission entity locks between a switch and a related user network interface, and provides the required transmission carrying capacity and wireless implementation system for transmitting a business data stream. For the DN domain name resolution service, all domain name resolution services of the UPF node are abstracted as a node, which is responsible for resolving a conversion process from domain name to IP address, and a subdirectory is linked with a domain name in the annotation of the IP address.

As shown in FIG. 5, the data flow interaction of the UPF shunting module is as follows.

N1: a data packet and life cycle management data are applied, and the life cycle is divided into four stages: activation, readiness, operation and death. A single data interaction process may be flexibly switched before death among the other three states.

N2: a Domain Name System (DNS) activates and wakes up, and at the same time, shunting of some DNS-based requests may be implemented.

N3: the connection between the first server and the second server is connected, and interaction of all MEC communication conditions and data stream transmission conditions is achieved in the middle.

N4: a data stream is transmitted upstream and downstream through a session, including business data, device information, newly defined differential data format, etc.

N9: after the uplink classification by a UPF uplink classifier node, tasks in different queues enter different UPF nodes to implement serial classification of uplink data. Meanwhile, the classified tasks may be executed in parallel to improve the efficiency.

The terminal differential calculation module is configured to plan computing resources, which can reduce the power consumption of the terminal and avoid the problem of insufficient power of the terminal. And the limitation of insufficient computing power of the terminal can be broken, and the calculation speed and precision of the differential data are improved.

The terminal differential resolution module is further configured to maintain the connection state between the first server 101 and the terminal 103, interact the first location information of the terminal in real time, and return the second location information of the terminal. Meanwhile, the terminal within the connection range of the first server may be verified by the user name and password. When the verification passes, the terminal can connect to the first server. During the time of establishing the connection, the terminal may use the terminal differential calculation service through the terminal differential calculation module.

The first server may upload the identity of the terminal and terminal type information to the second server after establishing a connection with the terminal. The first server may also send connection information to the second server. The second server stores the identity of the terminal, terminal type information connection information such as the time when the terminal establishes connection with the first server, and request information. If the terminal connected to the first server is disconnected or out of the connection range, when connected to another first server again, the first server device may query the second server whether the connection information of the terminal already exists. If yes, a connection may be established directly, a terminal differential calculation service is provided, and the second server synchronizes the latest historical information of the terminal, such as second coordinate information of the terminal within the historical time. If not, the terminal may be verified by the user name and password, and when the verification passes, the terminal can connect to the first server. The first server provides terminal differential calculation service to the terminal.

Figure 6:
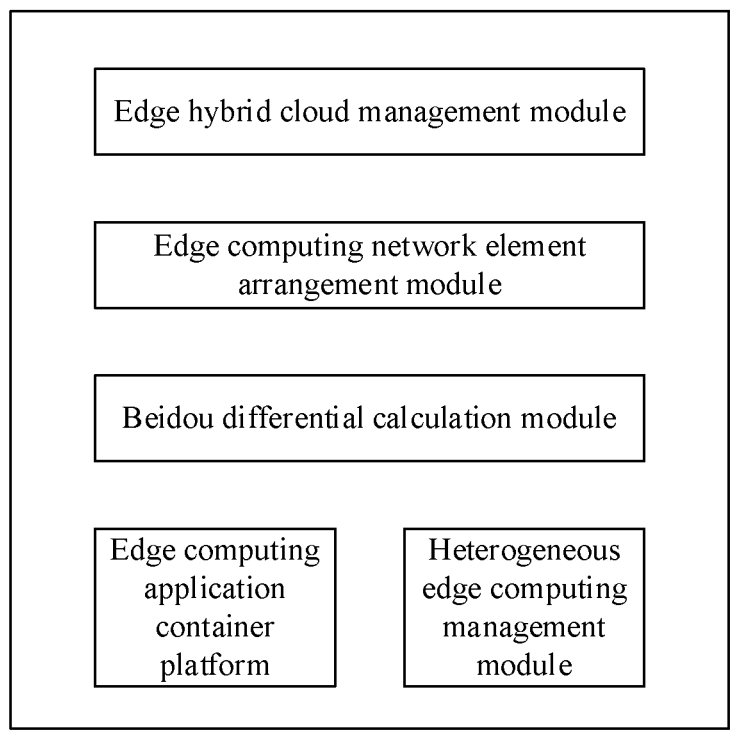
FIG. 6 is a structural schematic diagram of a second server according to an embodiment of the application.

The second server 102 is mainly configured to manage a plurality of first servers connected to the second server, integrate and synchronize the data of the plurality of first servers, and process and distribute the differential data of a designated area. The second server includes an edge hybrid cloud management module, an edge computing network element arrangement module, a Beidou differential calculation module, an edge computing application container platform, a heterogeneous edge computing management module and the like. A platform is built based on Docker and Kubernetes, which facilitates containerized management of the first server and dynamic adjustment of the network and server resources of the first server, as shown in FIG. 6.

The Beidou differential calculation module is configured to measure a positioning and navigation satellite signal and determine the differential data of the terminal according to the measured positioning and navigation satellite signal. For each managed first server, a differential data model is established for the calculation within the service range of the first server, and the differential data of each first server is calculated, stored and updated.

The positioning system provided by the embodiment of the application further includes a Beidou reference station 104 and a base station 105. Herein, the Beidou reference station is configured to receive the positioning and navigation satellite signal sent by a satellite. The Beidou reference station sends the positioning and navigation satellite signal to the second server. The base station 105 is configured to provide an interface for the first server to access the Internet.

Based on the positioning system shown in FIG. 1, the method of positioning implemented by the first server 101, the second server 102 and the terminal 103 in the positioning system is described in detail below.

Before the terminal 103 communicates with the first server 101, a connection to the first server 101 needs to be first established. Establishing a connection between the terminal 103 and the first server 101 includes establishing a connection for the first time and establishing a connection for the non-first time.

In some embodiments of the application, the terminal 103 establishes a connection with the first server 101 for the first time, including the following operations.

The terminal 103 sends a connection request to the first server 101. The connection request includes the user name and password of the terminal.

After receiving the connection request sent by the terminal 103, the first server 101 verifies the terminal according to the user name and password.

When the verification of the terminal passes, the first server 101 establishes a connection with the terminal 103.

The connection request refers to a request that the terminal 103 initiates a connection to the first server 101. The connection request includes the user name and password of the terminal. The first server 101 may verify whether the user name and password of the terminal 103 match or not. When the user name and password of the terminal do not match, the terminal 103 cannot connect to the first server 101. When the user name and password of the terminal match, the terminal 103 can connect to the first server 101.

In some embodiments, the connection request also includes an identity of the terminal and terminal type information. After receiving the connection request, the first server 101 may send the identity of the terminal and terminal type information in the connection request to the second server 102. After the second server 102 receives the identity of the terminal and terminal type information, the identity of the terminal and terminal type information are stored.

In some embodiments of the application, the terminal 103 establishes a connection with the first server 101 for the non-first time, including the following operations.

The first server 101 sends a query request to the second server 102. The query request includes the identity of the terminal and a time stamp of the terminal.

The second server determines whether the terminal corresponding to the identity of the terminal is stored in the second server. When the terminal corresponding to the identity of the terminal is stored in the second server and the time stamp of the terminal is not less than a preset time stamp, the second server sends a connection instruction to the first server.

The first server receives the connection instruction and establishes a communication connection with the terminal according to the connection instruction.

The time stamp of the terminal refers to the time stamp of the last time when the terminal disconnects from the first server 101. After the last communication connection between the terminal and the first server is established, the second server 102 stores the identity of the terminal, and when the terminal is disconnected from the first server, the time stamp of the disconnection of the terminal from the first server is stored in the second server. When the second server is connected to a plurality of first servers, the second server stores the terminal corresponding to the identity of the terminal and the time stamp of the last disconnection of the terminal from the first server, so that the terminal switches among the plurality of first server devices.

For example, the location of a mobile terminal is constantly changed during moving, and the first servers corresponding to different locations are different. Therefore, during moving, the terminal may establish connections with the plurality of first servers. Every time a connection is established with a first server, the first server may query related information of the terminal in the second server. If the related information of the terminal, such as the identity of the terminal, is stored, and the time when the terminal is disconnected from the first server does not exceed a preset time threshold, the connection may be directly established and the service is restored. Meanwhile, the differential calculation data of the mobile terminal within a preset time period is synchronized to the first server where the terminal re-establishes the connection.

As an example, the second server is connected to a first server A and a second server B. When the terminal moves beyond the range of the first server A, the network connection with the first server A may be automatically shut off, and a connection with the first server B may be established. The connection process is as follows.

The terminal sends a connection request to the first server B, and the connection request may include the identity of the terminal and the time stamp of the terminal. In addition, the connection request may also include terminal location information, user name and password of the terminal.

The first server B sends a query request to the second server. The query request includes the identity of the terminal and a time stamp of the terminal.

The second server queries a database, and queries whether the terminal corresponding to the identity is stored in the database according to the identity of the terminal in a stored connection history table. If the terminal exists, a connection permission instruction is returned. If not, a verification instruction is returned.

The first server B judges whether the communication connection can be directly established according to the instruction returned by the second server. If the instruction is a connection instruction, the first server B establishes a communication connection with the terminal and may receive the first location information of the terminal. If the instruction is a verification instruction, the first server B verifies the user name and password of the terminal in the connection request. After the verification passes, the first server B establishes a communication connection with the terminal.

After the terminal 103 establishes a communication connection with the first server 101, high-precision positioning is performed on the terminal.

Figure 7:
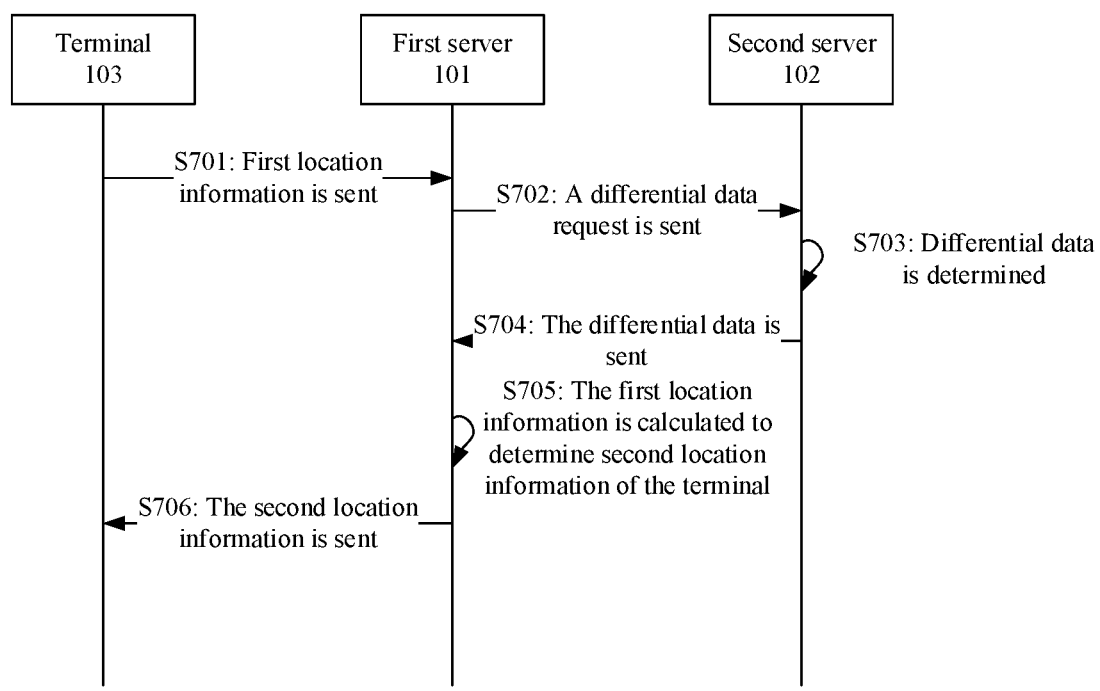
FIG. 7 is a flowchart of a positioning method according to an embodiment of the application.

As shown in FIG. 7, the positioning system provided by the embodiment of the application implements high-precision positioning through the following steps.

At S701, the terminal 103 sends first location information to the first server 101. The first location information includes the identity of the terminal.

The first location information refers to information that can indicate an approximate location of the terminal. The precision of the first location information cannot meet the terminal or device having high-precision positioning requirements. A data format in the Global Positioning System (GPS) protocol may be employed to indicate the approximate location of the terminal.

In some embodiments, the first location information may further include terminal type information and/or terminal location information.

The terminal type information includes a mobile terminal, a fixed terminal and a delay calculation terminal. The mobile terminal refers to a terminal that requires the first server 101 to respond to the requested differential data thereof in real time. The fixed terminal refers to a terminal that requests the second location information from the first server 101 according to a preset frequency, for example, requesting the second location information from the first server every half hour. The delay calculation terminal refers to a terminal with poor time sensitivity. For example, when the delay calculation terminal requests the second location information from the first server 101, the first server 101 and the second server 102 may respond to the request of the delay calculation terminal when the first server 101 and the second server 102 are in an idle state or the calculation pressure is low.

Terminal location information may include statement identifier information, world time information, latitude information, latitude hemisphere information, longitude information and longitude hemisphere information. The statement identifier information is identifier information used to identify a message sequence. The latitude information, the latitude hemisphere information, the longitude information and the longitude hemisphere information can indicate the current location of the terminal.

At S702, the first server 10 receives the first location information sent by the terminal and sends a differential data request to the second server 102. The differential data request includes the first location information.

After receiving the first location information, the first server 101 may generate the differential data request according to the first location information. The first server 101 sends the differential data request to the second server 102. Here, the first location information includes the identity of the terminal. The second server can determine the terminal that acquires the second location information according to the identity of the terminal.

In some embodiments, the first location information also includes terminal type information. After receiving the first location information sent by the terminal, the first server 101 may mark the terminal according to the terminal type information. When the terminal type information is the mobile terminal, the UPF shunting module in the first server 101 may mark the information flow of the terminal as the information flow of an emergency queue, and save the identity of the terminal and the terminal type information to a mobile terminal-device database. When the terminal type information is the fixed terminal, the UPF shunting module in the first server 101 may mark the information flow of the terminal as the information flow of a conventional queue, and save the identity of the terminal and the terminal type information to a fixed terminal-device database. When the terminal type information is the delay calculation terminal, the UPF shunting module in the first server 101 may mark the information flow of the terminal as the information flow of a suspended queue, and save the identity of the terminal and the terminal type information to a delay calculation terminal-device database.

Based on the terminal type information, the UPF shunting module enables the terminal to transmit messages in an independent queue, thus avoiding the congestion of all messages in a peak period of information transmission.

The corresponding terminals in different independent queues request a positioning service with different frequencies. For example, the frequency of the mobile terminal requesting the positioning service may be once per second, and real-time analysis is required to obtain the second location information. Therefore, the mobile terminal needs to enter the emergency queue for information processing, and the first server's local resources are given priority in scheduling. When the local resources are insufficient, the second server is requested for resources, and the second server expands related computing resources to the first server to implement dynamic allocation and management of the computing resources. The frequency of the fixed terminal requesting the positioning service is generally once every 30 minutes, once every 60 minutes, or a longer time interval. The connection between the first server and the terminal does not need to be maintained for a long time, so the terminal may request to re-establish the connection with the first server every time requesting the positioning service, thus saving the memory resources and network resources of the first server. The fixed terminal enters the conventional queue, and messages in the conventional queue are sent to the second server to request differential data after being simple filtered by the first server according to a rule, thus alleviating the computing pressure of the first server. Generally, the delay calculation terminal is used to analyze the weather forecast and other related positions, and the frequency of analysis is once or twice a year, since the data volume is large, it is put into the suspended queue by the first server, the request is forwarded to the second server, and the second server is responsible for caching all historical data and unified analysis. The request queue is reasonably allocated, the terminal location calculation capability of the whole system is improved using the difference between the computing power of the first server and the computing power of the second server, the computing resources and network resources are reasonably used, and network delay is reduced.

At S703, the second server 102 receives the differential data request sent by the first server, and determines the differential data of the terminal according to the differential data request.

The differential data request includes the first location information, the time stamp of the first server and the identity of the first server. After receiving the differential data request, the second server 102 can determine the differential data of the terminal according to the differential data request.

In the embodiment of the application, the second server may determine service area information of the first server according to the identity of the first server, and determine the differential data according to the first location information and the service area information of the first server.

The service area information of the first server is determined according to the identity of the first server. The database of the second server 102 stores the information of the first server, such as the identity of the first server and the service area information corresponding to the first server.

Herein, the service area information of the first server is essentially divided by the location of the first server 101. For example, an area with a radius of 10 Km and with the location coordinates of the first server as the center is the service area of the first server. For example, the service area information of the first server is centered at 39"26' north latitude and has a radius of 10 Km. When the second server determines the differential data, the area information corresponding to the differential data needs to correspond to the service area information of the first server.

Different terminals have different sensitivity to time. The stronger the terminal sensitivity to time is, the lower the time delay of determining the differential data is. When determining the differential data, the second server 102 needs to determine the sensitivity of the terminal to time according to the terminal type information. When the terminal type information is the mobile terminal, the terminal is highly sensitive to time, and the second server may send the pre-calculated differential data to the first server, thus reducing the time delay. When the terminal type information is the fixed terminal, the sensitivity of the terminal to time is low, and the second server may calculate the differential data after receiving the differential data request. When the terminal type information is the delay calculation terminal, the sensitivity of the terminal to time is very low, and the second server may determine the differential data when the second server is idle or the computing resources of the second server are sufficient.

The terminal type information is combined to determine the differential data, so that the terminal location calculation capability of the whole positioning system can be improved, the computing resources and network resources are reasonably used, and network delay is greatly reduced.

At S704, the first server 101 receives the differential data sent by the second server 102.

At S705, the first server 101 calculates the first location information according to the differential data to determine second location information of the terminal.

The second location information refers to information that can indicate a precise location of the terminal. The precision of the second location information is higher than the precision of the first location information.

The process of calculating the first location information by the first server may be that the terminal location information in the first location information of the terminal is corrected according to the differential data, so as to obtain the second location information with higher precision.

At S706, the terminal 103 receives the second location information sent by the first server 101.

After obtaining the second location information of the terminal 103, the first server 101 may back up the second location information of the terminal 103 corresponding to the identity of the terminal, and send the second location information of the terminal to the second server 102. The second server 102 stores the second location information of the terminal 103 as the historical positioning information of the terminal. Herein, the historical positioning information also includes the identity of the terminal, positioning time of the second location information, and the terminal type information. The second server 102 stores the historical positioning information of the terminal, so that other first servers 101 connected to the second server 102 may query or synchronize the historical positioning information of the terminal.

The positioning system provided by the embodiment of the application utilizes the high-precision positioning platform based on edge computing constructed by a "cloud+ edge+end" mode, which reduces the bandwidth pressure on the cloud side and disperses the computing pressure on the cloud side. Using the first server to calculate the differential data may greatly improve the computing power and the calculation precision. The differential data is determined by shortened physical distance between the first server and the terminal and the type of the terminal, which reduces the interaction delay caused by network communication.

Based on the first server in the positioning system, detailed description is made below to the positioning method based on the first server side.

Figure 8:
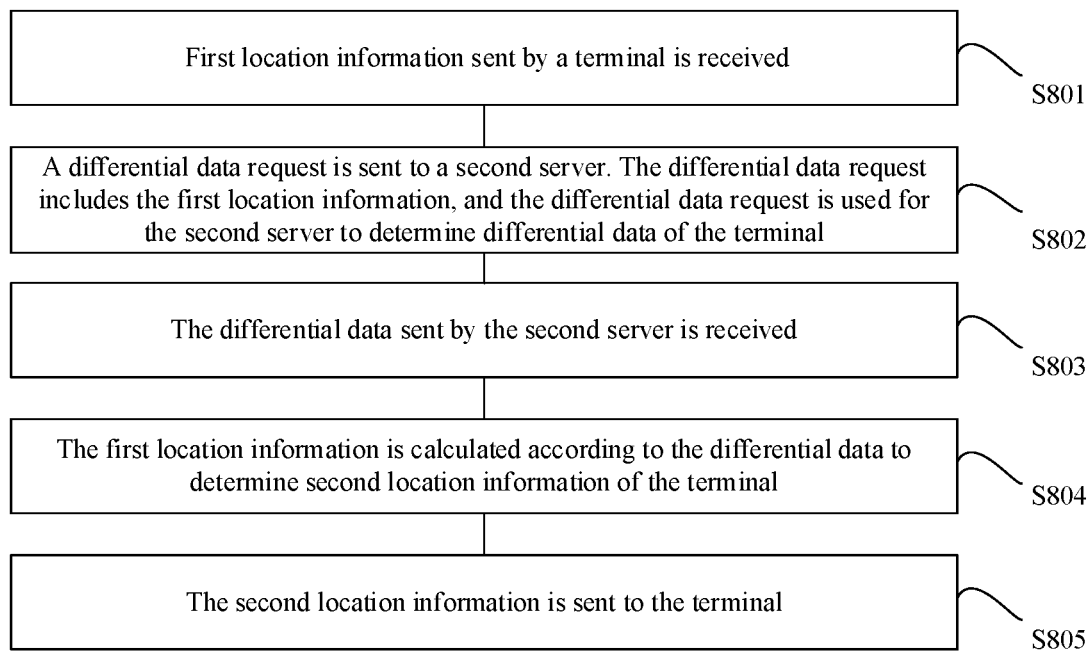
FIG. 8 is a flowchart of another positioning method according to an embodiment of the application.

FIG. 8 is a flowchart of a positioning method according to an embodiment of the application.

As shown in FIG. 8, the positioning method provided in the embodiment of the application is applied to a first server 101 and includes the following operations.

At S801, first location information sent by a terminal is received. The first location information includes an identity of the terminal.

The first location information refers to information that can indicate an approximate location of the terminal. The precision of the first location information cannot meet the terminal or device having high-precision positioning requirements. A data format in a GPS protocol may be employed to indicate the approximate location of the terminal.

In some embodiments, the first location information may further include terminal type information and/or terminal location information.

The terminal type information includes a mobile terminal, a fixed terminal and a delay calculation terminal. The mobile terminal refers to a terminal that requires the first server 101 to respond to the requested differential data thereof in real time. The fixed terminal refers to a terminal that requests the second location information from the first server 101 according to a preset frequency, for example, requesting the second location information from the first server every half hour. The delay calculation terminal refers to a terminal with poor time sensitivity. For example, when the delay calculation terminal requests the second location information from the first server 101, the first server 101 and the second server 102 may respond to the request of the delay calculation terminal when the first server 101 and the second server 102 are in an idle state or the calculation pressure is low.

Terminal location information may include statement identifier information, world time information, latitude information, latitude hemisphere information, longitude information and longitude hemisphere information. The statement identifier information is identifier information used to identify a message sequence. The latitude information, the latitude hemisphere information, the longitude information and the longitude hemisphere information can indicate the current location of the terminal.

After the first location information is received, the differential data request may be generated according to the first location information. The differential data request is sent to the second server 102. Here, the first location information includes the identity of the terminal. The second server can determine the terminal that acquires the second location information according to the identity of the terminal.

In some embodiments, the first location information also includes terminal type information. After receiving the first location information sent by the terminal, the first server 101 may mark the terminal according to the terminal type information. When the terminal type information is the mobile terminal, the UPF shunting module in the first server 101 may mark the information flow of the terminal as the information flow of an emergency queue, and save the identity of the terminal and the terminal type information to a mobile terminal-device database. When the terminal type information is the fixed terminal, the UPF shunting module in the first server 101 may mark the information flow of the terminal as the information flow of a conventional queue, and save the identity of the terminal and the terminal type information to a fixed terminal-device database. When the terminal type information is the delay calculation terminal, the UPF shunting module in the first server 101 may mark the information flow of the terminal as the information flow of a suspended queue, and save the identity of the terminal and the terminal type information to a delay calculation terminal-device database.

Based on the terminal type information, the UPF shunting module enables the terminal to transmit messages in an independent queue, thus avoiding the congestion of all messages in a peak period of information transmission.

The corresponding terminals in different independent queues request a positioning service with different frequencies. For example, the frequency of the mobile terminal requesting the positioning service may be once per second, and real-time analysis is required to obtain the second location information. Therefore, the mobile terminal needs to enter the emergency queue for information processing, and the first server's local resources are given priority in scheduling. When the local resources are insufficient, the second server is requested for resources, and the second server expands related computing resources to the first server to implement dynamic allocation and management of the computing resources. The frequency of the fixed terminal requesting the positioning service is generally once every 30 minutes, once every 60 minutes, or a longer time interval. The connection between the first server and the terminal does not need to be maintained for a long time, so the terminal may request to re-establish the connection with the first server every time requesting the positioning service, thus saving the memory resources and network resources of the first server. The fixed terminal enters the conventional queue, and messages in the conventional queue are sent to the second server to request differential data after being simple filtered by the first server according to a rule, thus alleviating the computing pressure of the first server. Generally, the delay calculation terminal is used to analyze the weather forecast and other related positions, and the frequency of analysis is once or twice a year, since the data volume is large, it is put into the suspended queue by the first server, the request is forwarded to the second server, and the second server is responsible for caching all historical data and unified analysis. The request queue is reasonably allocated, the terminal location calculation capability of the whole system is improved using the difference between the computing power of the first server and the computing power of the second server, the computing resources and network resources are reasonably used, and network delay is reduced.

At S802, a differential data request is sent to the second server. The differential data request includes the first location information, and the differential data request is used for the second server to determine the differential data of the terminal.

The differential data request includes the identity of the terminal, terminal type information and location information of the first server. The differential data request is sent to the second server according to the identity of the terminal and the terminal type information. After receiving the differential data request, the second server can determine the differential data of the terminal according to the identity information of the terminal, the terminal type information and the location information of the first server in the differential data request.

At S803, the differential data sent by the second server is received.

At S804, the first location information is calculated according to the differential data to determine second location information of the terminal.

At S805, the second location information is sent to the terminal.

After obtaining the second location information of the terminal 103, the first server 101 may back up the second location information of the terminal 103 corresponding to the identity of the terminal, and send the second location information of the terminal to the second server 102. The second server 102 stores the second location information of the terminal 103 as the historical positioning information of the terminal. Herein, the historical positioning information also includes the identity of the terminal, positioning time of the second location information, and the terminal type information. The second server 102 stores the historical positioning information of the terminal, so that other first servers connected to the second server may query or synchronize the historical positioning information of the terminal.

In some embodiments, before the terminal 103 communicates with the first server 101, a connection to the first server 101 needs to be established. The way to establish a connection between the terminal 103 and the first server 101 includes establishing a connection for the first time and establishing a connection for the non-first time.

In some embodiments of the application, the terminal 103 may send a connection request to the first server 101. The connection request includes a user name and password of the terminal.

After receiving the connection request sent by the terminal 103, the first server 101 verifies the terminal according to the user name and password.

When the verification of the terminal passes, the first server 101 establishes a connection with the terminal 103.

The connection request refers to a request that the terminal 103 initiates a connection to the first server 101. The connection request includes the user name and password of the terminal. The first server 101 may verify whether the user name and password of the terminal 103 match or not. When the user name and password of the terminal do not match, the terminal 103 cannot connect to the first server 101. When the user name and password of the terminal match, the terminal 103 can connect to the first server 101.

In some embodiments, the connection request also includes an identity of the terminal and terminal type information. After receiving the connection request, the first server 101 may send the identity of the terminal and terminal type information in the connection request to the second server 102. After the second server 102 receives the identity of the terminal and terminal type information, the identity of the terminal and terminal type information are stored.

In some embodiments of the application, the terminal 103 establishes a connection with the first server 101 for the non-first time, including the following operations.

The first server 101 sends a query request to the second server 102. The query request includes the identity of the terminal and a time stamp of the terminal.

The second server determines whether the terminal corresponding to the identity of the terminal is stored in the second server. When the terminal corresponding to the identity of the terminal is stored in the second server and the time stamp of the terminal is not less than a preset time stamp, the second server sends a connection instruction to the first server.

The first server receives the connection instruction and establishes a communication connection with the terminal according to the connection instruction.

The time stamp of the terminal refers to the time stamp of the last time when the terminal disconnects from the first server 101. After the last communication connection between the terminal and the first server is established, the second server 102 stores the identity of the terminal, and when the terminal is disconnected from the first server, the time stamp of the disconnection of the terminal from the first server is stored in the second server. When the second server is connected to a plurality of first servers, the second server stores the terminal corresponding to the identity of the terminal and the time stamp of the last disconnection of the terminal from the first server, so that the terminal switches among the plurality of first server devices.

For example, the location of a mobile terminal is constantly changing during moving, and the first servers corresponding to different locations are different. Therefore, during moving, the terminal may establish connections with the plurality of first servers. Every time a connection is established with the first server, the first server may query related information of the terminal in the second server. If the related information of the terminal, such as the identity of the terminal, is stored, and the time when the terminal is disconnected from the first server does not exceed a preset time threshold, the connection may be directly established and the service is restored. Meanwhile, the differential calculation data of the mobile terminal within a preset time period is synchronized to the first server where the terminal re-establishes the connection.

As an example, the second server is connected to a first server A and a second server B. When the terminal moves beyond the range of the first server A, the network connection with the first server A may be automatically shut off, and a connection with the first server B may be established. The connection process is as follows.

The terminal sends a connection request to the first server B, and the connection request may include the identity of the terminal and the time stamp of the terminal. In addition, the connection request may also include terminal location information, user name and password of the terminal.

The first server B sends a query request to the second server. The query request includes the identity of the terminal and a time stamp of the terminal.

The second server queries a database, and queries whether the terminal corresponding to the identity is stored in the database according to the identity of the terminal in a stored connection history table. If the terminal exists, a connection permission instruction is returned. If not, a verification instruction is returned.

The first server B judges whether the communication connection can be directly established according to the instruction returned by the second server. If the instruction is a connection instruction, the first server B establishes a communication connection with the terminal and may receive the first location information of the terminal. If the instruction is a verification instruction, the first server B verifies the user name and password of the terminal in the connection request. After the verification passes, the first server B establishes a communication connection with the terminal.

After the terminal 103 establishes a communication connection with the first server 101, high-precision positioning is performed on the terminal.

According to the positioning method provided by the embodiment of the application, first location information sent by a terminal is received by a first server. The first location information includes the identity of the terminal. A differential data request is sent to a second server. The differential data request includes the first location information, and the differential data request is used for the second server to determine the differential data of the terminal. Differential data sent by the second server is received. According to the differential data, the first location information is calculated to obtain the second location information. The second location information is sent to the terminal, and then a terminal positioning result is quickly returned, so that a network delay is greatly reduced when the terminal determines the precise location.

Based on the terminal in the positioning system, detailed description is made below to the positioning method based on the terminal side.

Figure 9:
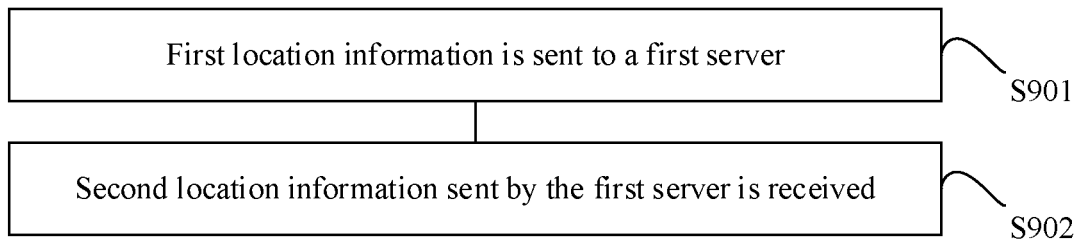
FIG. 9 is a flowchart of yet another positioning method according to an embodiment of the application.

FIG. 9 is a flowchart of a positioning method according to an embodiment of the application.

As shown in FIG. 9, the positioning method provided in the embodiment of the application is applied to a terminal 103 and includes the following operations.

At S901, first location information is sent to a first server. The first location information includes an identity of the terminal.

At S902, second location information sent by the first server is received.

The first location information refers to information that can indicate an approximate location of the terminal. The precision of the first location information cannot meet the terminal or device having high-precision positioning requirements. A data format in a GPS protocol may be employed to indicate the approximate location of the terminal.

In some embodiments, the first location information may further include terminal type information and/or terminal location information.

The terminal type information includes a mobile terminal, a fixed terminal and a delay calculation terminal. The mobile terminal refers to a terminal that requires the first server 101 to respond to the requested differential data thereof in real time. The fixed terminal refers to a terminal that requests the second location information from the first server 101 according to a preset frequency, for example, requesting the second location information from the first server every half hour. The delay calculation terminal refers to a terminal with poor time sensitivity. For example, when the delay calculation terminal requests the second location information from the first server 101, the first server 101 and the second server 102 may respond to the request of the delay calculation terminal when the first server 101 and the second server 102 are in an idle state or the calculation pressure is low.

Terminal location information may include statement identifier information, world time information, latitude information, latitude hemisphere information, longitude information and longitude hemisphere information. The statement identifier information is identifier information used to identify a message sequence. The latitude information, the latitude hemisphere information, the longitude information and the longitude hemisphere information can indicate the current location of the terminal.

After receiving the first location information, the first server 101 may generate the differential data request according to the first location information. The differential data request is sent to the second server 102. Here, the first location information includes the identity of the terminal. The second server can determine the terminal that acquires the second location information according to the identity of the terminal.

In some embodiments, the first location information also includes terminal type information. After receiving the first location information sent by the terminal, the first server 101 may mark the terminal according to the terminal type information. When the terminal type information is the mobile terminal, the UPF shunting module in the first server 101 may mark the information flow of the terminal as the information flow of an emergency queue, and save the identity of the terminal and the terminal type information to a mobile terminal-device database. When the terminal type information is the fixed terminal, the UPF shunting module in the first server 101 may mark the information flow of the terminal as the information flow of a conventional queue, and save the identity of the terminal and the terminal type information to a fixed terminal-device database. When the terminal type information is the delay calculation terminal, the UPF shunting module in the first server 101 may mark the information flow of the terminal as the information flow of a suspended queue, and save the identity of the terminal and the terminal type information to a delay calculation terminal-device database.

Based on the terminal type information, the UPF shunting module enables the terminal to transmit messages in an independent queue, thus avoiding the congestion of all messages in a peak period of information transmission.

The corresponding terminals in different independent queues request a positioning service with different frequencies. For example, the frequency of the mobile terminal requesting the positioning service may be once per second, and real-time analysis is required to obtain the second location information. Therefore, the mobile terminal needs to enter the emergency queue for information processing, and the first server's local resources are given priority in scheduling. When the local resources are insufficient, the second server is requested for resources, and the second server expands related computing resources to the first server to implement dynamic allocation and management of the computing resources. The frequency of the fixed terminal requesting the positioning service is generally once every 30 minutes, once every 60 minutes, or a longer time interval. The connection between the first server and the terminal does not need to be maintained for a long time, so the terminal may request to re-establish the connection with the first server every time requesting the positioning service, thus saving the memory resources and network resources of the first server. The fixed terminal enters the conventional queue, and messages in the conventional queue are sent to the second server to request differential data after being simple filtered by the first server according to a rule, thus alleviating the computing pressure of the first server. Generally, the delay calculation terminal is used to analyze the weather forecast and other related positions, and the frequency of analysis is once or twice a year, since the data volume is large, it is put into the suspended queue by the first server, the request is forwarded to the second server, and the second server is responsible for caching all historical data and unified analysis. The request queue is reasonably allocated, the terminal location calculation capability of the whole system is improved using the difference between the computing power of the first server and the computing power of the second server, the computing resources and network resources are reasonably used, and network delay is reduced.

According to the positioning method provided by the embodiment of the application, the first location information is sent to the first server. The first location information includes the identity of the terminal. The second location information sent by the first server is received, and then a terminal positioning result is quickly returned, so that a network delay is greatly reduced when the terminal determines the precise location.

In some embodiments of the application, the first server sends a target message to the second server, and the target message includes the identity of the terminal, terminal type information and second location information, so that the second server can store the target message.

In the embodiment of the application, the first server may send the target message to the second server, so that the second target server can save the target information. Here, the target information includes the identity of the terminal, terminal type information and second location information.

Based on the second server in the positioning system, detailed description is made below to the positioning method based on the second server side.

Figure 10:
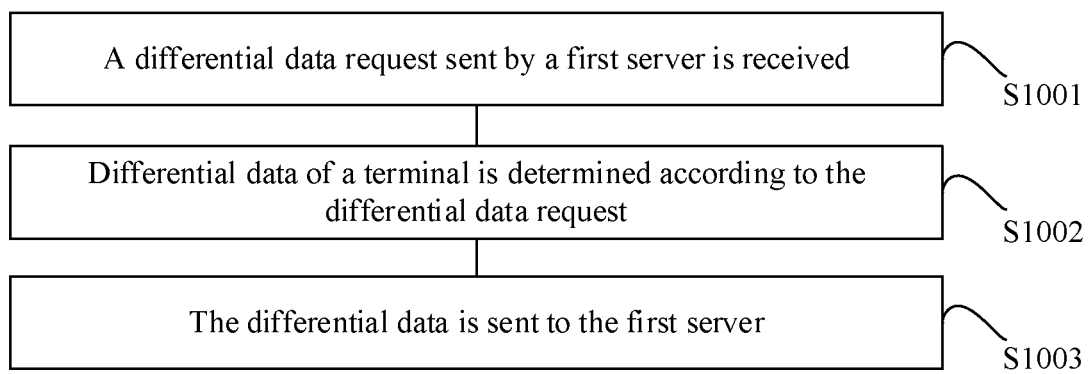
FIG. 10 is a flowchart of still another positioning method according to an embodiment of the application.

FIG. 10 is a flowchart of a positioning method according to an embodiment of the application.

As shown in FIG. 10, the positioning method provided in the embodiment of the application is applied to a second server 102 and includes the following operations.

At S1001, a differential data request sent by a first server is received. The differential data request includes first location information, and the first location information includes an identity of a terminal.

The differential data request includes the first location information. The differential data request may further include a time stamp of the first server and an identity of the first server.

At S1002, differential data of the terminal is determined according to the differential data request.

In the embodiment of the application, after receiving the differential data request, the second server may determine the differential data of the terminal according to the differential data request.

In the embodiment of the application, the second server may determine service area information of the first server according to the identity of the first server, and determine the differential data according to the first location information and the service area information of the first server.

The service area information of the first server is determined according to the identity of the first server. The database of the second server 102 stores the information of the first server, such as the identity of the first server and the service area information corresponding to the first server.

Herein, the service area information of the first server is essentially divided according to the location of the first server 101. For example, an area with a radius of 10 Km and with the location coordinates of the first server as the center is the service area of the first server. For example, the service area information of the first server is centered at 39"26' north latitude and has a radius of 10 Km. When the second server determines the differential data, the area information corresponding to the differential data needs to correspond to the service area information of the first server.

Different terminals have different sensitivity to time. The stronger the terminal sensitivity to time is, the lower the time delay of determining the differential data is. When determining the differential data, the second server 102 needs to determine the sensitivity of the terminal to time according to the terminal type information. When the terminal type information is the mobile terminal, the terminal is highly sensitive to time, and the second server may send the pre-calculated differential data to the first server, thus reducing the time delay. When the terminal type information is the fixed terminal, the sensitivity of the terminal to time is low, and the second server may calculate the differential data after receiving the differential data request. When the terminal type information is the delay calculation terminal, the sensitivity of the terminal to time is very low, and the second server may determine the differential data when the second server is idle or the computing resources of the second server are sufficient.

The terminal type information is combined to determine the differential data, so that the terminal location calculation capability of the whole positioning system can be improved, the computing resources and network resources are reasonably used, and network delay is greatly reduced.

At S1003, the differential data is sent to the first server.

According to the positioning method provided by the embodiment of the application, the differential data request sent by the first server is received. The differential data request includes the first location information. The first location information includes the identity of the terminal. The differential data of the terminal is determined according to the differential data request. The differential data is sent to the first server for the first server to calculate the first location information of the terminal according to the differential data and determine the second location information of the terminal. The first location information of the terminal is the first location information sent by the terminal to the first server, and the second location information is sent to the terminal for the terminal to perform positioning according to the second location information, so that the terminal positioning result can be quickly returned, and the network delay is greatly reduced when the terminal determines a precise location.

Figure 11:
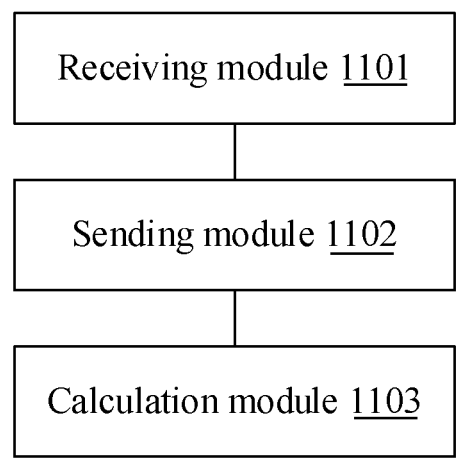
FIG. 11 is a structural schematic diagram of a positioning apparatus according to an embodiment of the application.

FIG. 11 is a structural schematic diagram of a positioning apparatus according to an embodiment of the application.

As shown in FIG. 11, the positioning apparatus provided in the embodiment of the application is applied to a first server and may include: a receiving module 1101, a sending module 1102, and a calculation module 1103.

The receiving module 1101 is configured to receive first location information sent by a terminal. The first location information includes an identity of the terminal.

The sending module 1102 is configured to send a differential data request to a second server. The differential data request includes the first location information, and the differential data request is used for the second server to determine the differential data of the terminal.

The receiving module 1101 is further configured to receive the differential data sent by the second server.

The calculation module 1103 is configured to calculate, according to the differential data, the first location information to obtain second location information.

The sending module 1102 is further configured to send the second location information to the terminal.

In some embodiments of the application, the first location information further includes terminal type information and/or terminal location information.

Terminal location information includes statement identifier information, world time information, latitude information, latitude hemisphere information, longitude information and longitude hemisphere information.

In some embodiments of the application, the differential data request includes a time stamp of the first server and an identity of the first server.

In some embodiments of the application, the terminal type information includes a mobile terminal, a fixed terminal and a delay calculation terminal.

In some embodiments of the application, the sending module 1102 is further configured to perform the following operations.

When the terminal type information is the mobile terminal, the differential data request is sent to the second server according to a first frequency.

Or, when the terminal type information is the fixed terminal, the differential data request is sent to the second server according to a second frequency.

Or, when the terminal type information is the delay calculation terminal, the differential data request is sent to the second server according to a third frequency.

In some embodiments of the application, the apparatus further includes: a verification module and a first connection module.

The receiving module 1101 is further configured to receive a connection request sent by the terminal. The connection request includes a user name and password of the terminal.

The verification module is configured to verify the terminal according to the user name and the password.

The first connection module is configured to establish a communication connection between the first server and the terminal when the verification of the terminal passes.

In some embodiments of the application, the sending module 1102 is further configured to send a query request to the second server. The query request includes the identity of the terminal and the time stamp of the terminal. The query request is used for the second server to determine whether the terminal corresponding to the identity of the terminal is stored, so that the second server sends a connection instruction to the first server when the terminal corresponding to the identity of the terminal is stored in the second server and the time stamp of the terminal is not less than a preset time stamp.

The receiving module 1101 is also configured to receive the connection instruction.

The first connection module is also configured to establish a communication connection with the terminal according to the connection instruction.

In some embodiments of the application, the first connection module is further configured to perform the following operations.

When the disconnection time between the first server and the terminal is not greater than a preset time threshold, the first server establishes a communication connection with the terminal.

In some embodiments of the application, the sending module 1102 is further configured to perform the following operations.

A target message is sent to the second server. The target message includes the identity of the terminal, the terminal type information and the second location information, so that the second server stores the target message.

In some embodiments of the application, the first server is an edge server, and the second server is a central server.

According to the positioning apparatus provided by the embodiment of the application, the receiving module is configured to receive the first location information sent by a terminal. The first location information includes the identity of the terminal. The sending module is configured to send a differential data request to a second server. The differential data request includes the first location information, and the differential data request is used for the second server to determine the differential data of the terminal. The receiving module is also configured to receive differential data sent by the second server. The calculation module is configured to calculate, according to the differential data, the first location information to obtain the second location information. The sending module is also configured to send the second location information to the terminal, so that a terminal positioning result can be quickly returned, and a network delay is greatly reduced when the terminal determines a precise location.

The positioning apparatus provided by the embodiment of the application executes all steps in the method shown in FIG. 8, and can achieve the technical effect that the terminal positioning result can be quickly returned and the network delay is greatly reduced when the terminal determines the precise location. For the sake of concise description, no elaboration is made here.

Figure 12:
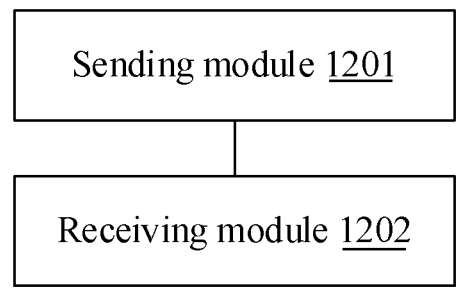
FIG. 12 is a structural schematic diagram of another positioning apparatus according to an embodiment of the application.

FIG. 12 is a structural schematic diagram of a positioning apparatus according to an embodiment of the application.

As shown in FIG. 12, the positioning apparatus provided in the embodiment of the application is applied to a terminal and may include: a sending module 1201 and a receiving module 1202.

The sending module 1201 is configured to send first location information to a first server. The first location information includes an identity of the terminal.

The receiving module 1202 is configured to receive second location information sent by the first server.

In some embodiments of the application, the apparatus further includes: a second connection module.

The sending module 1201 is configured to send a connection request to the first server. The connection request includes a user name and password of the terminal for the first server to verify the terminal according to the user name and password.

The second connection module is configured to establish a communication connection between the terminal and the first server when the verification of the terminal passes.

In some embodiments of the application, the terminal type information includes a mobile terminal, a fixed terminal and a delay calculation terminal.

According to the positioning apparatus provided by the embodiment of the application, the sending module is configured to send the first location information to a first server. The first location information includes the identity of the terminal. The receiving module is configured to receive second location information sent by the first server, so that a terminal positioning result can be quickly returned, and the network delay is greatly reduced when the terminal determines a precise location.

The positioning apparatus provided by the embodiment of the application executes all steps in the method shown in FIG. 9, and can achieve the technical effect that the terminal positioning result can be quickly returned and the network delay is greatly reduced when the terminal determines the precise location. For the sake of concise description, no elaboration is made here.

Figure 13:
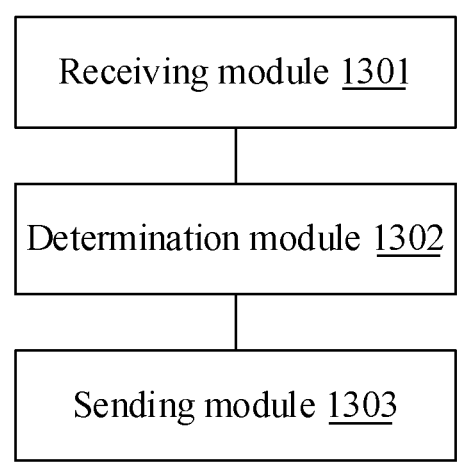
FIG. 13 is a structural schematic diagram of yet another positioning apparatus according to an embodiment of the application.

FIG. 13 is a structural schematic diagram of a positioning apparatus according to an embodiment of the application.

As shown in FIG. 13, the positioning apparatus provided in the embodiment of the application is applied to a second server and may include: a receiving module 1301, a determination module 1302, and a sending module 1303.

The receiving module 1301 is configured to receive a differential data request sent by a first server. The differential data request includes first location information, and the first location information includes an identity of a terminal.

The determination module 1302 is configured to determine differential data of the terminal according to the differential data request.

The sending module 1303 is configured to send the differential data to the first server.

In some embodiments of the application, the first location information further includes terminal type information and/or terminal location information. The differential data request also includes a time stamp of the first server and an identity of the first server.

The determination module 1302 is also configured to perform the following operations.

Service area information of the first server is determined according to the identity of the first server.

The differential data is determined according to the first location information and the service area information of the first server.

In some embodiments of the application, the terminal type information includes a mobile terminal, a fixed terminal and a delay calculation terminal.

According to the positioning apparatus provided by the embodiment of the application, the receiving module is configured to receive the differential data request sent by a first server. The differential data request includes the first location information. The first location information includes the identity of the terminal. The determination module is configured to determine the differential data of the terminal according to the differential data request. The sending module is configured to send the differential data to the first server for the first server to calculate the first location information of the terminal according to the differential data and determine the second location information of the terminal, and send the second location information to the terminal for the terminal to perform positioning according to the second location information, so that a terminal positioning result can be quickly returned, and the network delay is greatly reduced when the terminal determines a precise location.

The positioning apparatus provided by the embodiment of the application executes all steps in the method shown in FIG. 10, and can achieve the technical effect that the terminal positioning result can be quickly returned and the network delay is greatly reduced when the terminal determines the precise location. For the sake of concise description, no elaboration is made here.

In addition, in combination with the positioning method in the above embodiment, the embodiment of the application may provide a computer storage medium for implementation. A computer program instruction is stored on the computer storage medium. When executed by a processor, the computer program instruction implements any positioning method in the above-mentioned embodiments.

It is to be noted that the application is not to be limited to specific configurations and processing described above and shown in the figures. For brevity, detailed descriptions about known methods are omitted herein. A plurality of specific steps are described and shown in the above-mentioned embodiments as examples. However, the process of the method of the application is not limited to the described and shown specific steps, and those skilled in the art may make various variations, modifications, and additions or change a sequence of the steps after understanding the spirit of the application.

The function block shown in the structure block diagram may be implemented as hardware, software, firmware, or a combination thereof. When being implemented as hardware, the function block may be, for example, an electronic circuit, an ASIC, and suitable firmware, plug-in, and functional card. When being implemented as software, the element of the application is a program or code segment for executing a required task. The program or code segment may be stored in a machine-readable medium, or transmitted on a transmission medium or communication link by a data signal contained in a carrier. The "machine-readable medium" may include any medium capable of storing or transmitting information. Examples of the machine-readable medium include an electronic circuit, a semiconductor memory device, a ROM, a flash memory, an Erasable ROM (EROM), a floppy disk, a Compact Disc ROM (CD-ROM), an optical disk, a hard disk, an optical fiber medium, an RF link, etc. The code segment may be downloaded through a computer network, such as the Internet and an intranet.

It is also to be noted that some methods or systems are described in the exemplary embodiments mentioned in the application based on a series of steps or apparatuses. However, the application is not limited to the sequence of the steps. That is, the steps may be executed according to the sequence mentioned in the embodiments, or a sequence different from that in the embodiments, or a plurality of steps may be executed at the same time.

The above is only the specific implementation mode of the application. Those skilled in the art may clearly learn about that specific working processes of the system, module, and unit described above may refer to the corresponding processes in the method embodiment and will not be elaborated herein for ease and briefness of description. It is to be understood that the scope of protection of the application is not limited thereto. Any equivalent modifications or replacements apparent to those skilled in the art within the technical scope disclosed by the application shall fall within the scope of protection of the application.

INDUSTRIAL APPLICABILITY

In the embodiments of the application, first location information sent by a terminal is received through a first server. The first location information includes an identity of the terminal. A differential data request is sent to a second server. The differential data request includes the first location information, and the differential data request is used for the second server to determine differential data of the terminal. The differential data sent by the second server is received. According to the differential data, the first location information is calculated to obtain second location information. The second location information is sent to the terminal, and then a terminal positioning result is quickly returned, so that the network delay is greatly reduced when the terminal determines a precise location.

What is claimed is:

1. A positioning method, applied to a first server, comprising:
receiving first location information sent by a terminal, the first location information comprising an identity of the terminal;
sending a differential data request to a second server, the differential data request comprising the first location information, and the differential data request being configured for the second server to determine the differential data of the terminal;
receiving the differential data sent by the second server;
calculating, according to the differential data, the first location information to obtain second location information; and
sending the second location information to the terminal, wherein the method further comprises:
sending a target message to the second server, the target message comprising the identity of the terminal, terminal type information and the second location information, so that the second server stores the target message.

2. The method of claim 1, wherein the first location information further comprises the terminal type information and/or terminal location information,
wherein the terminal location information comprises: statement identifier information, world time information, latitude information, latitude hemisphere information, longitude information and longitude hemisphere information.

3. The method of claim 2, wherein the differential data request further comprises a time stamp of the first server and an identity of the first server.

4. The method of claim 2, wherein the terminal type information comprises a mobile terminal, a fixed terminal and a delay calculation terminal.

5. The method of claim 4, wherein sending a differential data request to a second server comprises:
when the terminal type information is the mobile terminal, sending the differential data request to the second server according to a first frequency, or
when the terminal type information is the fixed terminal, sending the differential data request to the second server according to a second frequency, or
when the terminal type information is the delay calculation terminal, sending the differential data request to the second server according to a third frequency.

6. The method of claim 1, before receiving first location information sent by a terminal, further comprising:
receiving a connection request sent by the terminal, the connection request comprising a user name and password of the terminal,
verifying the terminal according to the user name and the password, and
establishing a communication connection between the first server and the terminal when the verification of the terminal passes.

7. The method of claim 6, before receiving first location information sent by a terminal, further comprising:
sending a query request to the second server, the query request comprising the identity of the terminal and the time stamp of the terminal, and the query request being configured for the second server to determine whether a terminal corresponding to the identity of the terminal is stored, so that the second server sends a connection instruction to the first server when the terminal corresponding to the identity of the terminal is stored in the second server and the time stamp of the terminal is not less than a preset time stamp;
receiving the connection instruction; and
establishing a communication connection with the terminal according to the connection instruction.

8. The method of claim 1, before receiving first location information sent by a terminal, further comprising:
when the disconnection time between the first server and the terminal is not greater than a preset time threshold, establishing a communication connection between the first server and the terminal.

9. The method of claim 1, wherein the first server is an edge server, and the second server is a central server.

10. A positioning method, applied to a second server, comprising:
receiving a differential data request sent by a first server, the differential data request comprising first location information, and the first location information comprising an identity of a terminal;
determining differential data of the terminal according to the differential data request; and
sending the differential data to the first server,
wherein the method further comprises:
receiving a target message sent by the first server, the target message comprising the identity of the terminal, terminal type information and second location information, so that the second server stores the target message.

11. The method of claim 10, wherein the first location information further comprises the terminal type information and/or terminal location information, and the differential data request further comprises a time stamp of the first server and an identity of the first server,
wherein determining differential data of the terminal according to the differential data request comprises:
determining service area information of the first server according to the identity of the first server; and
determining the differential data according to the first location information and the service area information of the first server.

12. The method of claim 11, wherein the terminal type information comprises a mobile terminal, a fixed terminal and a delay calculation terminal.

13. A positioning apparatus, applied to a second server, comprising a processor and a memory configured to store instructions executable by the processor,
wherein when the instructions are executed by the processor, the processor is configured to cause the positioning apparatus to perform:
receiving a differential data request sent by a first server, the differential data request comprising first location information, and the first location information comprising an identity of a terminal;
determining differential data of the terminal according to the differential data request; and
sending the differential data to the first server,
wherein the processor is further configured to cause the positioning apparatus to perform:
receiving a target message sent by the first server, the target message comprising the identity of the terminal, terminal type information and second location information, so that the second server stores the target message.

14. The positioning apparatus of claim 13, wherein the first location information further comprises the terminal type information and/or terminal location information, and the differential data request further comprises a time stamp of the first server and an identity of the first server,
wherein determining differential data of the terminal according to the differential data request comprises:
determining service area information of the first server according to the identity of the first server; and
determining the differential data according to the first location information and the service area information of the first server.

15. The positioning apparatus of claim 14, wherein the terminal type information comprises a mobile terminal, a fixed terminal and a delay calculation terminal.

* * * * *